(12) United States Patent
Yamada et al.

(10) Patent No.: US 7,940,990 B2
(45) Date of Patent: May 10, 2011

(54) IMAGE SIGNAL PROCESSING APPARATUS AND IMAGE SIGNAL PROCESSING METHOD

(75) Inventors: Tokuichiro Yamada, Kanagawa (JP); Zhiwen Li, Tokyo (JP); Ken Nakajima, Tokyo (JP); Kenichi Sakai, Tokyo (JP)

(73) Assignee: Sony Corporation (JP)

( * ) Notice: Subject to any disclaimer, the term of this patent is extended or adjusted under 35 U.S.C. 154(b) by 861 days.

(21) Appl. No.: 11/881,160

(22) Filed: Jul. 25, 2007

(65) Prior Publication Data

US 2008/0137972 A1 Jun. 12, 2008

(30) Foreign Application Priority Data

Aug. 2, 2006 (JP) .............................. P2006-211031

(51) Int. Cl.
*G06K 9/36* (2006.01)
(52) U.S. Cl. ...................................................... 382/232
(58) Field of Classification Search .......... 382/232–233, 382/236, 239–240, 248, 251; 375/240.01, 375/240.08, 240.11, 240.18, 240.19; 348/408.1, 348/420.1; 358/426.01–426.09
See application file for complete search history.

(56) References Cited

U.S. PATENT DOCUMENTS

| | | | | |
|---|---|---|---|---|
| 6,011,868 A * | 1/2000 | van den Branden et al. | . | 382/233 |
| 6,898,323 B2 * | 5/2005 | Schwartz et al. | ............. | 382/240 |
| 6,898,325 B2 * | 5/2005 | Gormish | ....................... | 382/248 |
| 6,904,178 B2 * | 6/2005 | Boliek et al. | .................. | 382/251 |

FOREIGN PATENT DOCUMENTS

| | | | |
|---|---|---|---|
| JP | 10-234043 | A | 9/1998 |
| JP | 10-285564 | A | 10/1998 |
| JP | 2000-092349 | A | 3/2000 |
| JP | 2002-010216 | A | 1/2002 |
| JP | 2003-153228 | A | 5/2003 |
| JP | 2004-096354 | A | 3/2004 |
| JP | 2004-112091 | A | 4/2004 |
| JP | 2004-221998 | A | 8/2004 |
| JP | 2005-045458 | A | 2/2005 |

* cited by examiner

*Primary Examiner* — Jose L Couso
(74) *Attorney, Agent, or Firm* — Lerner, David, Littenberg, Krumholz & Mentlik, LLP

(57) ABSTRACT

An image signal processing apparatus may include a partial image data block obtaining unit configured to obtain partial image data blocks by dividing image data corresponding to a predetermined screen having a predetermined number of horizontal and vertical pixels into image data portions, each having a predetermined number of partial horizontal and vertical pixels, at predetermined positions; a packet generating unit configured to generate packets, each storing one of the partial image data blocks; and one or more signal processing units configured to receive the packets from a transmission path through which the image data is transmitted, perform signal processing in units of partial image data blocks stored in the packets, and output the image data in the form of packets to the transmission path.

20 Claims, 11 Drawing Sheets

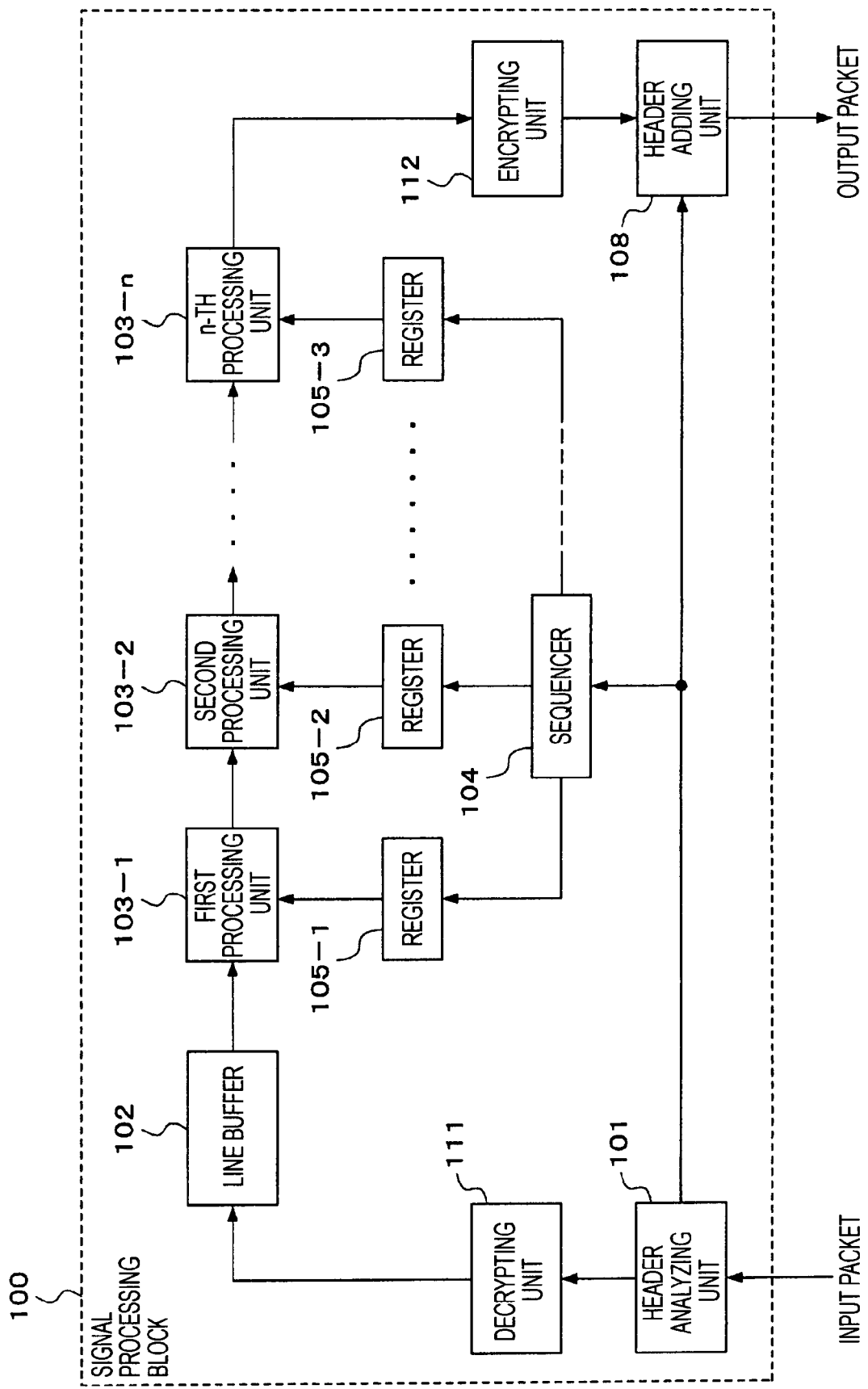

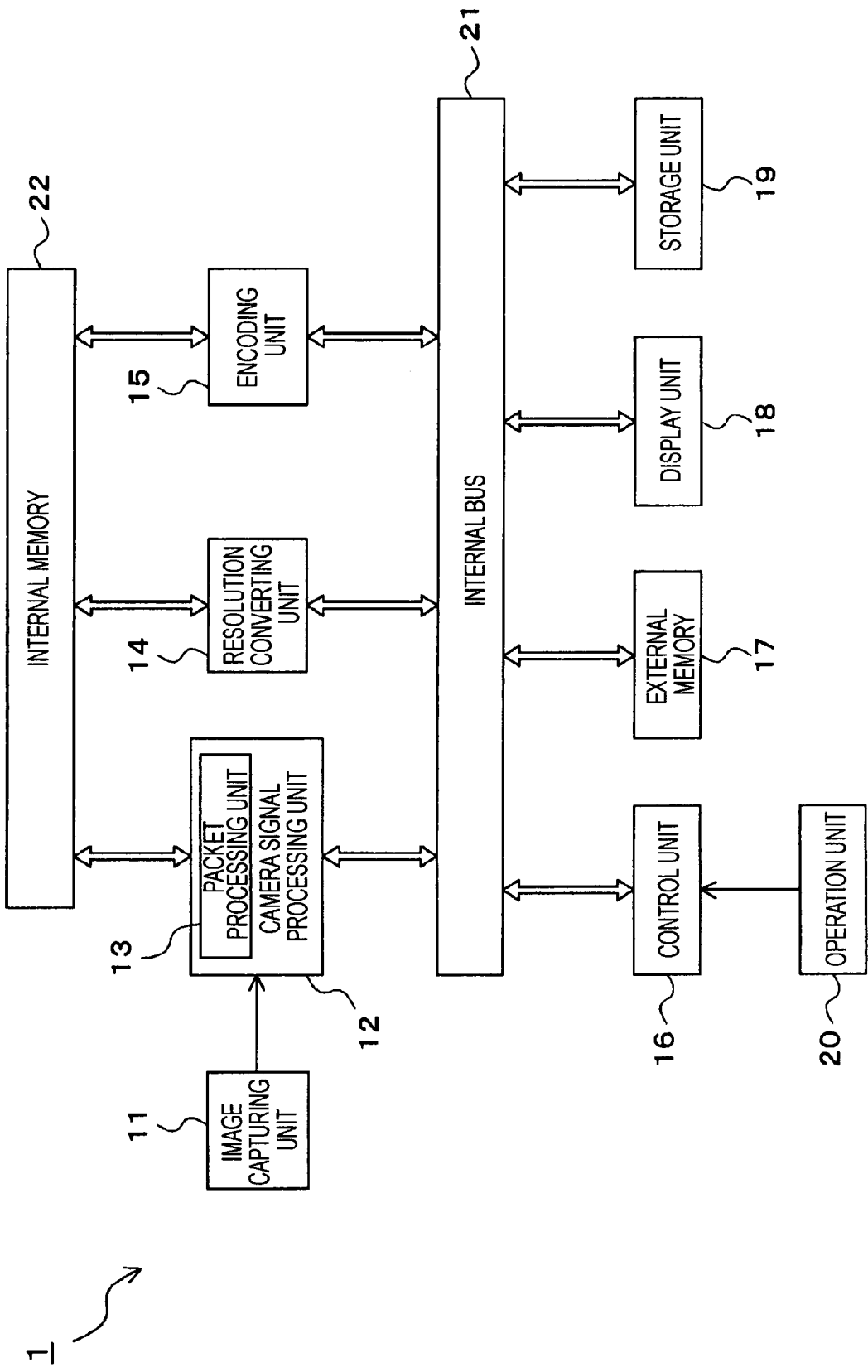

IMAGE SIGNAL PROCESSING APPARATUS AND IMAGE SIGNAL PROCESSING METHOD

CROSS-REFERENCE TO RELATED APPLICATIONS

This application claims priority from Japanese Patent Application No. JP 2006-211031 filed in the Japanese Patent Office on Aug. 2, 2006, the entire content of which is incorporated herein by reference.

BACKGROUND OF THE INVENTION

1. Field of the Invention

The present invention relates to an image signal processing apparatus to perform image signal processing on image data of a predetermined format corresponding to image signals, and to an image signal processing method.

2. Description of the Related Art

An apparatus to process images is configured to perform one or more predetermined processes (image signal processing) on image signals in accordance with the purpose of use.

For example, in an image capturing apparatus to record a captured image as a moving image or a still image, camera signal processing to perform signal processing to generate image data as a moving image or a still image from signals obtained by an image capturing unit (camera) is performed first, and then other types of image signal processing including conversion of an image size and compression/encoding are sequentially performed. Then, the image data to be recorded that is eventually generated by those types of image signal processing is written on a medium of a predetermined format and is stored therein.

Patent Document 1 (Japanese Unexamined Patent Application Publication No. 2000-92349) describes a configuration related to resolution conversion performed as image signal processing.

SUMMARY OF THE INVENTION

Image data has a considerably large data amount per unit of reproducing time compared to voice data, for example. Accordingly, a large-scale circuit is used to perform image signal processing, and thus a processing load applied on a CPU (central processing unit) to control the image signal processing is heavy. For these reasons, it is preferable that an apparatus to perform image signal processing is configured to be as efficient as possible with a miniaturized circuit.

In view of the above-described problem, an image signal processing apparatus according to an embodiment of the present invention may include partial image data block obtaining means for obtaining partial image data blocks by dividing image data corresponding to a predetermined screen having a predetermined number of horizontal and vertical pixels into image data portions, each having a predetermined number of partial horizontal and vertical pixels, at predetermined positions; packet generating means for generating packets, each storing one of the partial image data blocks; and one or more signal processing means for receiving the packets from a transmission path through which the image data is transmitted, performing signal processing in units of partial image data blocks stored in the packets, and outputting the image data in the form of packets to the transmission path.

In the above-described configuration, as the image data on which image signal processing is to be performed, partial image data blocks each including a predetermined number of partial horizontal and vertical pixels may be formed based on image data of one screen. Herein, the number of partial horizontal and vertical pixels may mean the number of successive horizontal pixels and the number of successive vertical pixels in a part of the total number of horizontal pixels and vertical pixels forming image data of one screen. Then, packets each storing one of the partial image data blocks may be generated, and the image data may be input/output to/from the image signal processing means in the form of packets.

In this case, each of the partial image data blocks may be obtained by extracting a rectangle portion of the image data of one screen. The size thereof may be smaller than that of the image data of the entire screen, and thus each packet has a small size. Accordingly, the partial image data block stored in each packet may be used as a minimum processing unit of image data in the signal processing means. Also, the size of an area to hold image data to be processed by the signal processing means may be much smaller compared to a case where image data of an entire screen is used as an image signal processing unit. This may enable a decrease in hardware scale. Furthermore, the time occupied by signal processing of image data of one signal processing unit may be significantly shortened in accordance with the smaller data size, which enhances signal processing efficiency.

In the above-described manner, according to an embodiment of the present invention, efficiency of image signal processing may be enhanced in terms of circuit configuration and processing efficiency.

BRIEF DESCRIPTION OF THE DRAWINGS

FIG. 10 illustrates a signal processing block according to another modification; and FIG. 11 illustrates a configuration of an image capturing apparatus according to a modification.

DETAILED DESCRIPTION

Hereinafter, an embodiment of the present invention is described. In this embodiment, a configuration of an image signal processing apparatus based on the present invention is applied to an image capturing apparatus capable of capturing and recording moving and still images.

Figure 1:
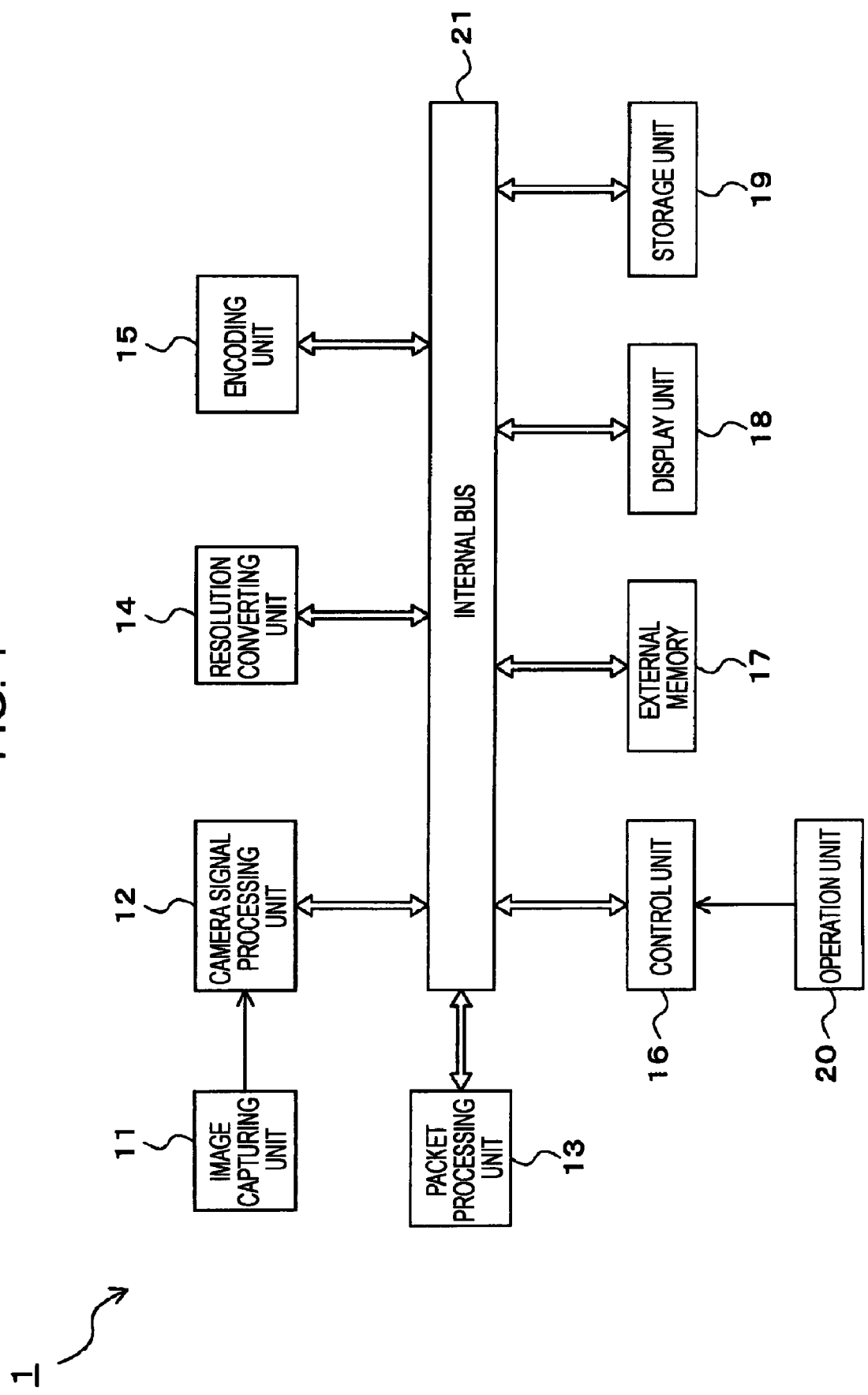
FIG. 1 is a block diagram of an example of a configuration of an image capturing apparatus according to an embodiment of the present invention.

In an image capturing apparatus 1 illustrated in FIG. 1, an image capturing unit 11 includes an optical system unit and an imaging device unit. The optical system unit includes a lens optical system, a focus mechanism, a shutter mechanism, and an iris mechanism. Light entered the optical system unit is focused as captured light onto a light receiving surface of the imaging device unit. The imaging device unit includes a photoelectric converting device, such as a CCD (charge-coupled device) or a CMOS (complementary metal-oxide semiconductor) sensor, performs photoelectric conversion on the captured light received by the light receiving surface, and outputs electric signals corresponding to a signal charge accumulated in accordance with the captured light received by the light receiving surface at predetermined timing.

In this case, a camera signal processing unit 12 performs signal processing called preprocessing.

In the preprocessing, the camera signal processing unit 12 receives signals output from the image capturing unit 11, performs a CDS (correlated double sampling) process and an AGC (automatic gain control) process, and converts the signals to digital image signals through A/D (analog to digital) conversion. Accordingly, image data as a moving image or a still image can be obtained.

Then, in this embodiment, the image data obtained through the above-described preprocessing is transferred to an external memory 17 via an internal bus 21 and is held therein under control by a control unit 16. The external memory 17 may be a volatile memory device represented by a DRAM (dynamic random access memory) or an SDRAM (synchronous DRAM) under present circumstances.

Then, in this embodiment, a packet processing unit 13 performs packetization on the image data that is transferred from the camera signal processing unit 12 and is held in the external memory 17. The details of a method for generating packets by the packet processing unit 13 and the structure of the generated packets are described below. Briefly, a two-dimensional image data area corresponding to one screen (one frame in a moving image) is divided into units of partial rectangular area data (data blocks), each including a predetermined number of horizontal/vertical pixels, and a header is added to each data block, so that packets are generated.

Thereafter, the image capturing apparatus 1 according to this embodiment performs image signal processing while regarding the data block (partial image data) in each packet generated in the above-described manner as a minimum processing unit. In the configuration illustrated in FIG. 1, a functional unit performing image signal processing on the packets includes a unit performing the preprocessing on digital signals (image data) provided in the camera signal processing unit 12, a resolution converting unit 14, and an encoding unit 15.

Thus, when the camera signal processing unit 12, the resolution converting unit 14, and the encoding unit 15 perform signal processing, data is input thereto in the form of packets from the internal bus 21 and predetermined processes are performed on the data blocks stored in the input packets. After the data blocks have been processed, they are packetized again and are output to the internal bus 21. With this configuration, in the image capturing apparatus 1 according to this embodiment, image data to be processed is transmitted in the form of packets between the units performing image signal processing.

The camera signal processing unit 12, the resolution converting unit 14, and the encoding unit 15 perform the following types of image signal processing on the data blocks in the packets.

First, the preprocessing performed on digital signals (image data) to process data blocks by the camera signal processing unit 12 includes a process of setting color balance including AWB (auto white balance).

Also, the camera signal processing unit 12 can perform predetermined signal processing on signals on which preprocessing for digital signals have been performed. That is, the camera signal processing unit 12 can perform the preprocessing in a stage of digital signals and predetermined camera signal processing for image signal data after the preprocessing. The camera signal processing includes signal processing to apply a special effect, such as conversion to an image of a color other than full-color, e.g., monochrome or sepia.

The resolution converting unit 14 performs signal processing to convert the resolution of image data on which the preprocessing and the camera signal processing have been performed by the camera signal processing unit 12 to another desired resolution. Herein, the resolution corresponds to an image size and is expressed by the number of horizontal pixels and the number of vertical pixels constituting one screen.

Typically, the image capturing unit 11 transfers signals obtained through image capturing performed by using all pixels given in the imaging device unit to the camera signal processing unit 12. Accordingly, in the stage of preprocessing in the camera signal processing unit 12, signal processing is performed on full-size image data corresponding to the number of pixels in the imaging device unit. On the other hand, when a captured moving or still image is to be recorded, an image size different from the above-described full-size is often set in accordance with an initial set value or user setting. In such a case, a process to change the image size is performed. The resolution converting unit 14 performs the process to change the image size by converting the resolution.

The resolution converting unit 14 performs the process to change the image size (resolution conversion), for example, by performing thinning or interpolation of pixel data forming image data in accordance with a predetermined rule based on a reducing or increasing ratio of the image size, so that the resolution according to a desired image size (the number of horizontal/vertical pixels) can be obtained.

The encoding unit 15 performs signal processing to compress and encode image data as a moving image or a still image by a predetermined method. The compressing and encoding method corresponding to the encoding unit 15 is not limited, but may be appropriately changed in accordance with the format of moving image data or still image data to be recorded or the format of a storage medium to store a captured image.

A series of image signal processing performed by the camera signal processing unit 12, the resolution converting unit 14, and the encoding unit 15 is performed to record a captured image as moving image data or still image data in a storage medium provided in a storage unit 19. Thus, the image signal processing performed by the camera signal processing unit 12, the resolution converting unit 14, and the encoding unit 15 is followed by a process to store the processed image data in the storage medium.

The image data may be recorded on the storage medium by specifying a unique format based on the form of packets. Alternatively, the image data may be recorded in accordance with the form of data to be recorded corresponding to the format of a standardized storage medium.

In this embodiment, the image data is recorded in accordance with the form of data to be recorded corresponding to the format of the standardized storage medium, considering general versatility. In that case, since the image data is in the form of packets in the image signal processing stage, the image data needs to be transformed into the form of recording data corresponding to the format of the storage medium in order to store the image data in the storage medium.

For this purpose, in this embodiment, unpacketization is performed to extract data blocks and the extracted data blocks are combined together, so that image data of one screen corresponding to the image data before packetization is restored. Then, the restored image data to be recorded is transferred to the storage unit 19 and is stored in the storage medium.

Such restoration of the image data, including unpacketization, is performed by the packet processing unit 13 by using the external memory 17 as a work area under control by the control unit 16. That is, for example, the packets on which necessary image signal processing has been performed are transferred to the external memory 17 and are held therein, and then the packet processing unit 13 performs a process to restore the image data on the packets held in the external memory 17.

In the configuration illustrated in FIG. 1, the external memory 17 may be provided only for packetization and unpacketization of image data performed by the packet processing unit 13, but may be used for another purpose. For example, the external memory 17 may be used as a work area to process image data when the camera signal processing unit 12 performs predetermined signal processing, when the resolution converting unit 14 performs resolution conversion, or when the encoding unit 15 performs compression/encoding or decoding.

The storage unit 19 to record image data on the storage medium in the above-described manner includes the storage medium of a predetermined format and a drive capable of writing/reading data on/from the storage medium. The storage medium included in the storage unit 19 is not specified, but may be a hard disk, a DVD (digital versatile disc), or a flash memory under present circumstances. The storage medium may be fixed in the image capturing apparatus together with the drive or may be provided to the drive in the storage unit 19 in a removable manner. The storage unit 19 performs management of stored data corresponding to the standard of a predetermined file system, so that moving image data or still image data stored in the storage medium can be managed in units of files.

The image capturing apparatus 1 also includes a display unit 18. The display unit 18 includes, for example, a display panel and a display driving circuit system of a configuration corresponding to the driving method of the display panel. For example, the camera signal processing unit 12 also performs signal processing to display a captured image on a monitor, and the image data to be displayed obtained by the processing is input to the display unit 18 via the internal bus 21. The display unit 18 drives the display panel based on the input image data to be displayed. Accordingly, the image is displayed on a screen of the display panel of the display unit 18.

Files of the moving image data or still image data recorded on the storage medium in the storage unit 19 can be read under control by the control unit 16. The data read from the storage medium can be displayed as a reproduced image in the display unit 18. For this purpose, the data read from the storage medium is processed as necessary. For example, the encoding unit 15 performs demodulation (decompression) with respect to compression/encoding, or the resolution converting unit 14 converts the resolution. Accordingly, image data to be displayed is obtained and is transferred to the display unit 18.

The control unit 16 controls each unit in the image capturing apparatus 1 and actually serves as a microcomputer including a CPU (central processing unit), a RAM (random access memory), and a ROM (read only memory) that are mutually connected via a bus. The RAM in the control unit 16 is mainly used as a work area of the CPU. For example, a program to be executed by the CPU is expanded in the RAM, or an operation result of the CPU is temporarily stored in the RAM. The ROM stores a program to be executed by the CPU and setting data required in various processes.

An operation unit 20 serves as an input operation unit including various operation buttons provided at a predetermined position of the casing of the image capturing apparatus 1 and a touch panel. The operation unit 20 outputs an operation information signal according to the result of an operation performed to the control unit 16 (CPU). The control unit 16 performs control and processing in accordance with the input operation information signal.

As can be understood by the description with reference to FIG. 1, in the image capturing apparatus 1 according to this embodiment, image data of one screen is divided and packetized, and the packetized image data is transmitted among the image signal processing units including the camera signal processing unit 12, the resolution converting unit 14, and the encoding unit 15. These image signal processing units perform predetermined types of image signal processing while regarding the data block (partial image data) extracted from each input packet as a processing unit.

In this embodiment, image signal processing is performed with transmission and input/output in units of packets, so that efficiency of the image signal processing is enhanced. This is described in detail below.

First, packetization of image data performed by the packet processing unit 13 is described.

Figure 2:
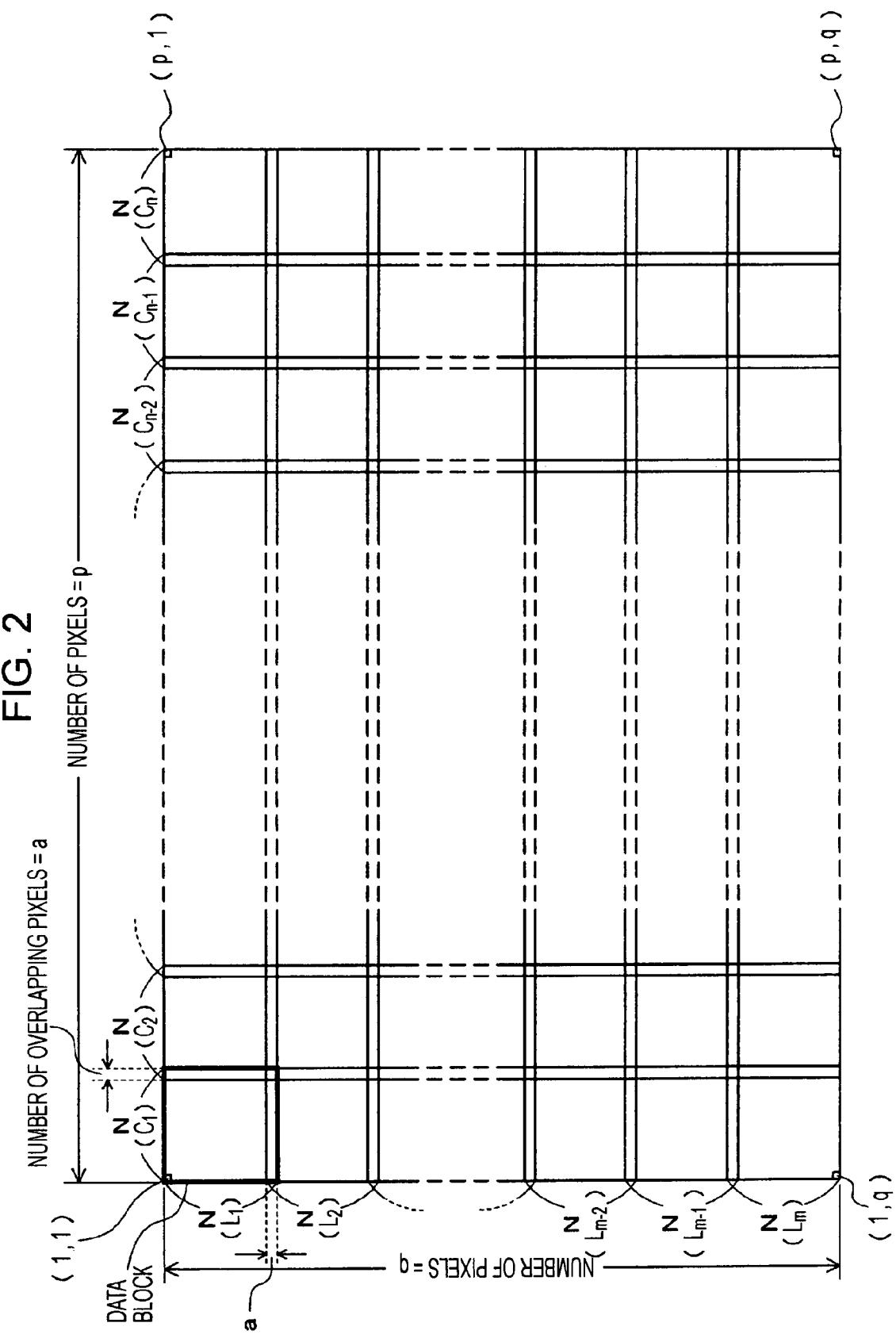
FIG. 2 illustrates a processing concept of generating data blocks according to the embodiment.

FIG. 2 schematically illustrates image data of one screen by means of an array of pixel data segments along the horizontal and vertical directions. Herein, the image data of one screen means image data of one frame of a moving image or image data of one still image. In the image data of one screen, the number of horizontal pixels is represented by "p" and the number of vertical pixels is represented by "q". That is, pixel data array of p×q constitutes the image data of one screen.

In this embodiment, such image data of one screen is packetized by the packet processing unit 13 and is held in the external memory 17.

Before packetization is performed by the packet processing unit 13, the image data illustrated in FIG. 2 is divided into a predetermined number of image data portions, each including a predetermined number of partial horizontal pixels and partial vertical pixels. The image data portions generated accordingly are regarded as data blocks.

More specifically, as illustrated in FIG. 2, each square image data portion including the number of horizontal pixels N/the number of vertical pixels N corresponds to the data block. In this case, the screen is divided not equally based on the number of horizontal pixels N/the number of vertical pixels N, but is divided so that an overlapping area of the number of pixels "a" is generated between data blocks adjoining in the horizontal and vertical directions (overlapping division), as illustrated in FIG. 2. As a result of the overlapping division, n×m data blocks: n columns from column $C_1$ to column $C_n$ and m lines from line $L_1$ to line $L_m$, can be generated in the image data of one screen.

The data blocks generated in the above-described manner can be classified into nine types in accordance with a placement state of the overlapping area ARo defined by the number of pixels "a" in the entire screen. For reference, the nine types of data blocks are illustrated in (a) to (i) of FIG. 3. Herein, the positions of the respective data blocks on the screen are indicated by coordinates, which are expressed by the column numbers $C_1$ to $C_n$ and the line numbers $L_1$ to $L_m$ corresponding to the respective data blocks illustrated in FIG. 2.

Figure 3:
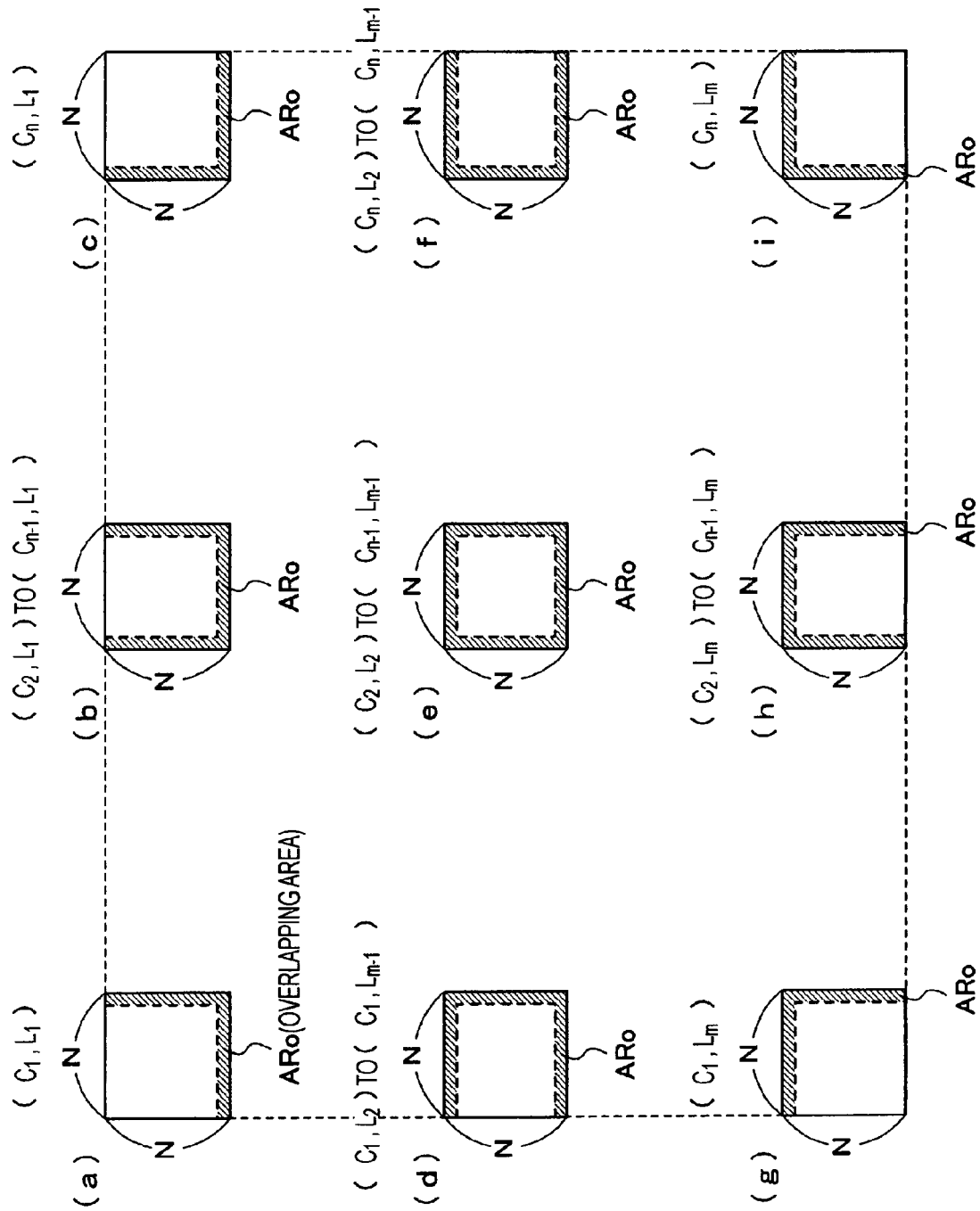
FIG. 3 illustrates the data blocks by type according to an overlapping area.

First, in (a) of FIG. 3, the data block at the coordinates ($C_1$, $L_1$) in the uppermost line and the left-end column is shown. In the data block at the coordinates ($C_1$, $L_1$), the pixels along the upper side and the left side thereof correspond to the pixels at an end portion of the original screen. There is no adjoining data block at the upper side and the left side, and thus there is no overlapping area. On the other hand, there are adjoining data blocks on the right side and the lower side, and thus the overlapping area ARo where the number of pixels "a" overlaps exists between the adjoining data blocks.

In (b) of FIG. 3, the data blocks at the coordinates ($C_2$, $L_1$) to ($C_{n-1}$, $L_1$), other than the data blocks at the right-end and left-end columns in the uppermost line of the screen, are shown. In these data blocks, the overlapping area ARo exists on the right, left, and lower sides.

In (c) of FIG. 3, the data block at the coordinates ($C_n$, $L_1$) in the uppermost line and the right-end column of the screen is shown. In this data block, the overlapping area ARo exists on the left and lower sides.

In (d) of FIG. 3, the data blocks at the coordinates ($C_1$, $L_2$) to ($C_1$, $L_{m-1}$), other than the data blocks in the uppermost and lowermost lines in the left-end column of the screen, are shown. In these data blocks, the overlapping area ARo exists on the upper, lower, and right sides.

In (e) of FIG. 3, the inner data blocks at the coordinates ($C_2$, $L_2$) to ($C_{n-1}$, $L_{m-1}$), other than the data blocks on outer edges, that is, the left- and right-end columns and the uppermost and lowermost lines of the screen, are shown. In these data blocks, the overlapping area ARo exists on all of four sides: the right, left, upper, and lower sides.

In (f) of FIG. 3, the data blocks at the coordinates ($C_n$, $L_2$) to ($C_n$, $L_{m-1}$), other than the data blocks in the uppermost lowermost lines in the right-end column of the screen, are shown. In these data blocks, the overlapping area ARo exists on the upper, lower, and left sides.

In (g) of FIG. 3, the data block at the coordinates ($C_1$, $L_m$) in the lowermost line and the left-end column of the screen is shown. In this data block, the overlapping area ARo exists on the right and upper sides.

In (h) of FIG. 3, the data blocks at the coordinates ($C_2$, $L_m$) to ($C_{n-1}$, $L_m$), other than the data blocks in the right- and left-end columns in the lowermost line of the screen, are shown. In these data blocks, the overlapping area ARo exists on the right, left, and upper sides.

In (i) of FIG. 3, the data block at the coordinates ($C_n$, $L_m$) in the lowermost line and the right-end column of the screen is shown. In this data block, the overlapping area ARo exists on the left and upper sides.

The overlapping area ARo is provided for the following reason.

For example, in some image signal processing including interpolation of pixels and compressing/encoding, pixel data at a reference position and pixel data at a predetermined distance from the reference position may be used to perform a process on a pixel position. In this embodiment, image signal processing is performed while regarding the data block stored in each packet as a processing unit, as described below. In this case, if the data blocks are formed by simply dividing the image data of one screen such that no overlapping area is provided and if signal processing is performed by using a pixel positioned on the periphery of the data blocks as a reference, an appropriate signal processing result is not obtained because of the absence of necessary neighboring pixels. In order to avoid such inconvenience, the overlapping area ARo where pixels are overlapped in the horizontal and vertical directions is provided.

Therefore, the number of pixels serving as the overlapping area ARo may be set in accordance with a distance to neighboring pixel data that is necessary in actual image signal processing. As described above with reference to FIG. 2, in the overlapping area ARo, the portion along the horizontal direction and the portion along the vertical direction have a width of the same number of pixels "a". However, the portions along the horizontal and vertical directions may have different widths each having a different number of pixels, depending on signal processing.

In the above-described manner, the packet processing unit 13 generates data blocks by defining image data portions in the image data of one screen in accordance with a predetermined rule. Then, the packet processing unit 13 regards the generated data blocks as operands and adds a header to each of them, so as to generate packets.

Figure 4:
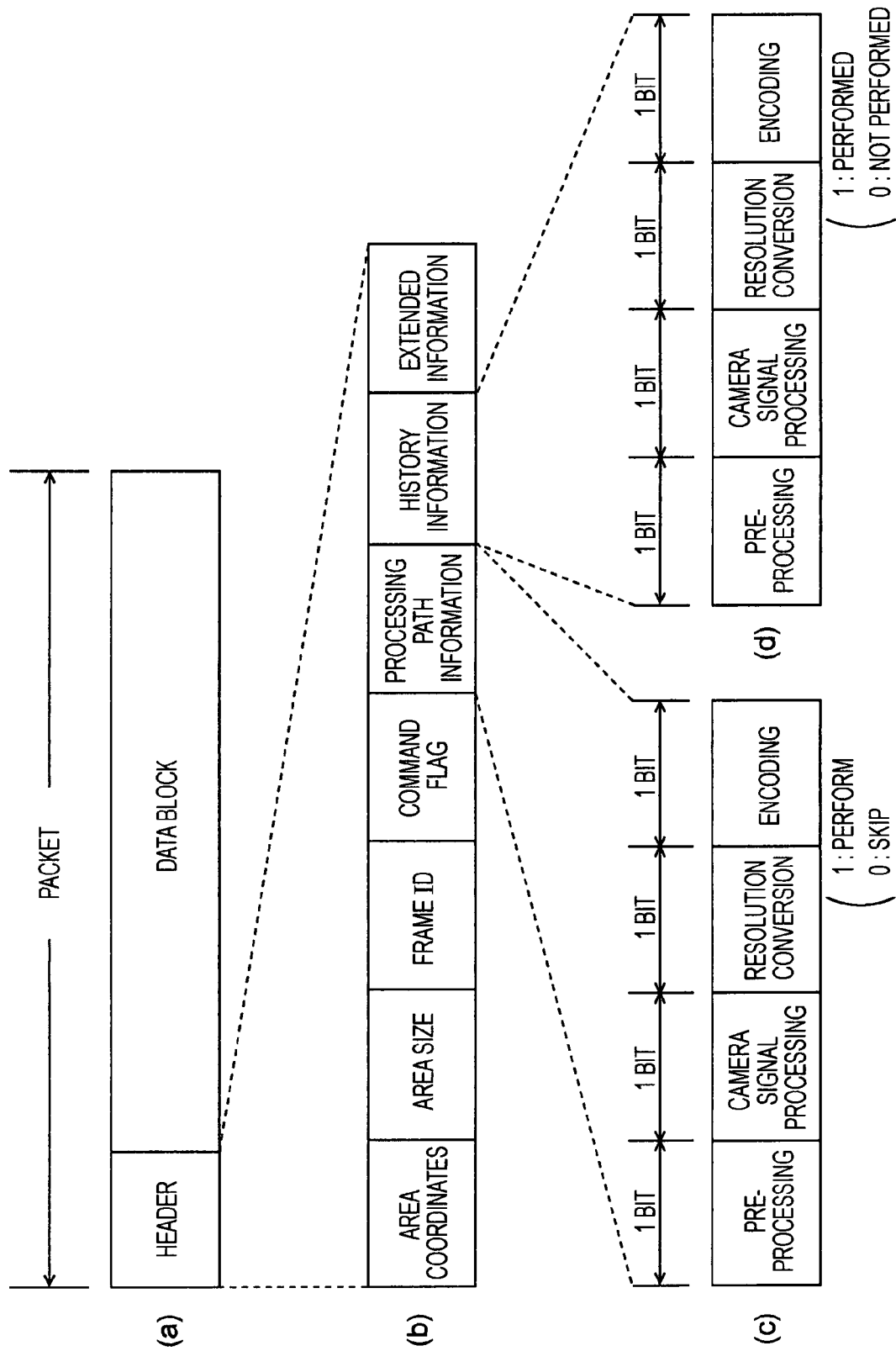
FIG. 4 illustrates an example of a configuration of a packet generated in the image capturing apparatus according to the embodiment.

FIG. 4 illustrates an example of a configuration of a packet generated by the packet processing unit 13.

As illustrated in (a) of FIG. 4, the entire packet includes a header and a data block that follows the header.

In FIG. 4, (b) illustrates an example of a configuration of the header. In this example, the header includes area coordinates, area size, frame ID, command flag, processing path information, history information, and extended information.

The area coordinates are information indicating the position on the screen of a partial data area as the data block stored as an operand in the packet. For example, information of the horizontal and vertical coordinates of pixel data on the screen can be used as the area coordinates.

That is, in view of the correspondence with FIG. 2, where the image data of one screen is illustrated with the number of horizontal pixels p and the number of vertical pixels q, the position of each piece of pixel data forming the screen can be indicated by coordinates. For example, the pixel data in the uppermost line and the left-end column can be indicated by pixel coordinates (1, 1), the pixel data in the uppermost line and the right-end column can be indicated by pixel coordinates (p, 1), the pixel data in the lowermost line and the left-end column can be indicated by pixel coordinates (1, q), and the pixel data in the lowermost line and the right-end column can be indicated by pixel coordinates (p, q). Accordingly, the pixel coordinates of the pixel data at a specific position in the pixel data forming the position of a data block can be used as the area coordinates. In this embodiment, the pixel coordinates of the pixel data at the upper left corner, that is, in the uppermost line and the left-end column in the data block, are stored as information of the area coordinates.

In the pixel coordinates of the pixel data at the upper left corner, that is, in the uppermost line and the left-end column in the data block, the horizontal and vertical coordinates can be indicated in the following way.

The number of horizontal pixels and the number of vertical pixels included in a block data are represented by "N", respectively, the number of overlapping pixels in the overlapping area ARo is represented by "a", the column number of each of the columns arranged from left to right in the horizontal direction in a case where the data blocks are arranged on one screen as illustrated in FIG. 2 is represented by "n" (natural number), and the line number of each of the lines arranged from the top to bottom in the vertical direction is represented by "m" (natural number). In this case, the horizontal coordinate can be expressed by the following expression (1).

$$1+(N-a)(n-1) \quad (1)$$

Also, the vertical coordinate can be expressed by the following expression (2).

$$1+(N-a)(m-1) \qquad (2)$$

For example, the packet processing unit 13 manages the positions of the data blocks by using the above-described line numbers "m" and column numbers "n" in a process of dividing the image data of one screen into data blocks, so that the packet processing unit 13 can obtain the value of pixel coordinates (horizontal coordinate, vertical coordinate) to be stored in the field of the area coordinates in the header added to the data block by using expressions (1) and (2).

In the configuration of the header illustrated in (b) of FIG. 4, the area size is information indicating the size of the area of the data block. In this embodiment, information of the number of horizontal pixels×the number of vertical pixels (=N×N) is stored as the area size.

The frame ID is identification information to specify the frame number of original frame image data in a case where the image data of the one screen (frame image data) forms a moving image. When the image data of the screen is a still image, a predetermined special value that is not used for a moving image is stored as the frame ID. Thus, by referring to the frame ID, it can be determined whether the data block in the packet belongs to a moving image or a still image.

As described above with reference to FIG. 1, the packets on which all necessary image signal processing have been performed are restored into image data corresponding to the original image of one screen by the packet processing unit 13. At that time, the packet processing unit 13 refers to at least the area coordinates and the frame ID stored in the header as position information indicating the position of the data block in the image data. Accordingly, the frame to which the data block stored in the packet belongs and the position in the frame are specified. Then, the packet processing unit 13 collects the data blocks belonging to the same frame image (still image) and places the data blocks in the correct coordinate positions. Accordingly, the image data is appropriately restored.

The command flag (parameter specifying information) is information to specify various parameters used in image signal processing. For example, such specifying information includes image size specifying information used in conversion of resolution performed by the resolution converting unit 14, and selection of a compressing and encoding method and information specifying a compression ratio used in a compressing and encoding process performed by the encoding unit 15. These various types of specifying information are stored in the field of the command flag in a predetermined configuration.

The processing path information (signal processing specifying information) is information to specify a path of signal processing to be performed on the data block stored in the packet.

The configuration of the processing path information includes four bits, as illustrated in (c) of FIG. 4. Preprocessing, camera signal processing, resolution conversion, and encoding are assigned to the four bits from the most significant bit to the least significant bit. Herein, the preprocessing means preprocessing performed on the data block in the packet by the camera signal processing unit 12. The camera signal processing means signal processing performed after the preprocessing by the camera signal processing unit 12. The resolution conversion and the encoding mean the processes performed by the resolution converting unit 14 and the encoding unit 15, respectively.

The value stored in each bit position corresponding to the preprocessing, camera signal processing, resolution conversion, and encoding is defined as follows. For example, "1" indicates that the process corresponding to the bit position is to be performed, while "0" indicates that the process corresponding to the bit position is skipped. Specifically, when the processing path information indicates 1101 from the most significant bit to the least significant bit, preprocessing, camera signal processing, and encoding are performed on the data block in the packet, but resolution conversion is skipped. Note that the parameters set in each of the preprocessing, camera signal processing, resolution conversion, and encoding are specified based on the information stored in the command flag.

The history information (progress indicating information) is information indicating the result of signal processing performed on the data block stored in the packet. An example of the configuration thereof is illustrated in (d) of FIG. 4. As in (c) of FIG. 4, the configuration includes four bits to which preprocessing, camera signal processing, resolution conversion, and encoding are assigned from the most significant bit to the least significant bit. The value stored in each bit position is defined as follows. That is, "1" indicates that the process has been performed, while "0" indicates that the process has not been performed. For example, when the history information indicates 1110, preprocessing, camera signal processing, and resolution conversion have been performed, but encoding has not been performed.

The extended information (processing result information) is various types of additional information about the data block stored in the packet. Some of the information about the image data can be obtained only after some processing has been performed on the image data. For example, an evaluation value of complexity of an image (frequency information) is obtained as one of results of signal processing in a predetermined stage. Such information is included in the extended information.

The configuration of the header of the packet illustrated in FIG. 4 is only an example and can be appropriately changed in accordance with the configuration of actual signal processing.

Hereinafter, an example of signal processing performed on the packets generated in the above-described manner is described with reference to FIG. 5.

Figure 5:
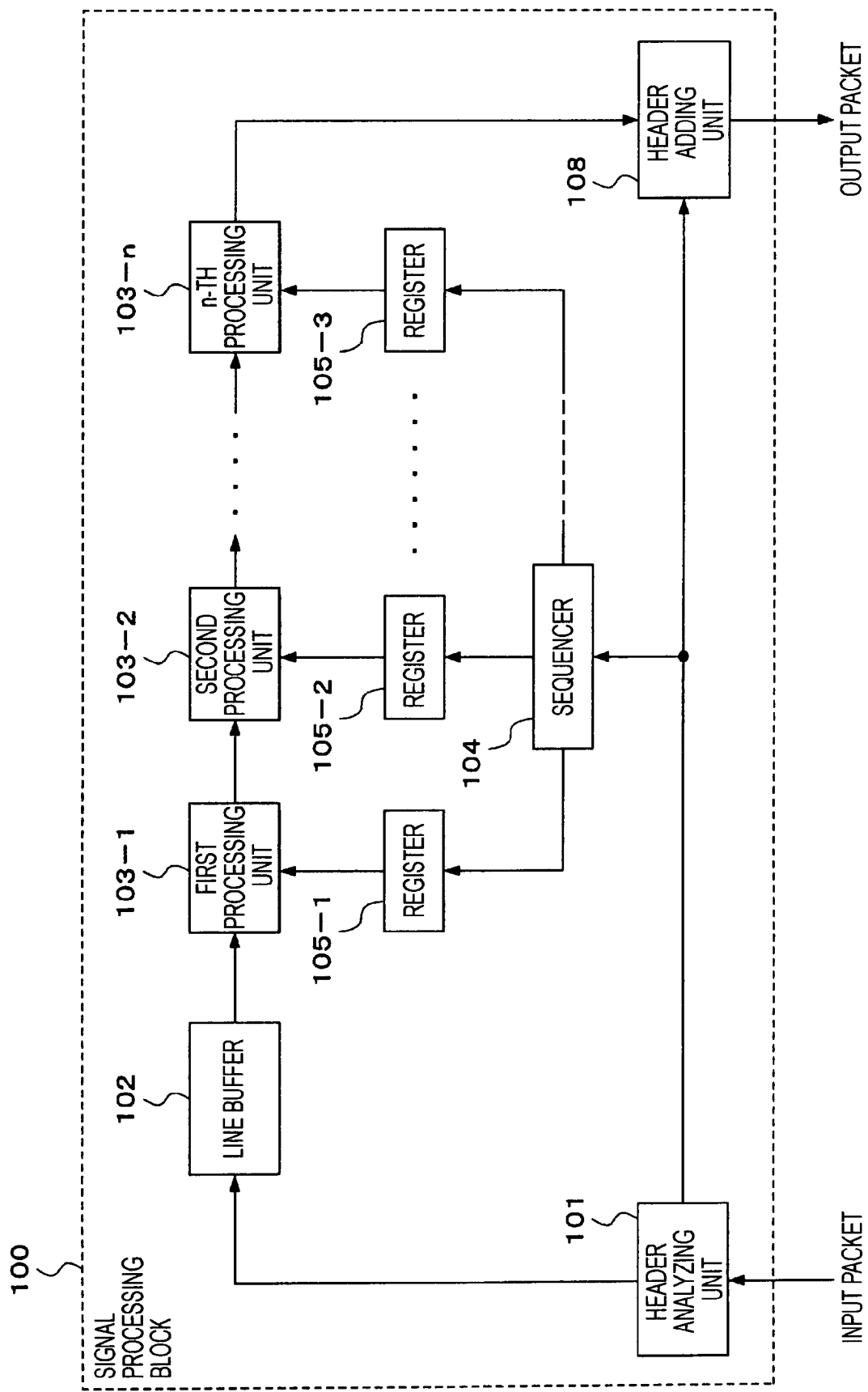
FIG. 5 illustrates an example of a configuration of a signal processing block 100 included in the image capturing apparatus according to the embodiment.

FIG. 5 illustrates an example of a configuration of a signal processing block 100. The signal processing block 100 corresponds to a common part having a function of performing image signal processing on input/output packets of the camera signal processing unit 12, the resolution converting unit 14, and the encoding unit 15 in the image capturing apparatus 1 according to this embodiment.

In the signal processing block 100, image data to be processed is input/output in the form of packets having the configuration illustrated in FIG. 4. Each of the packets input to the signal processing block 100 is input to a header analyzing unit 101 first.

The header analyzing unit 101 unpacketizes the packet input from the internal bus 21 so as to separately obtain a header and a data block, and analyzes the header. That is, the header analyzing unit 101 recognizes the content of the header and sets an operation mode of signal processing in the signal processing block 100 in accordance with the recognition result. Herein, setting of an operation mode includes setting of whether signal processing is to be performed and setting of parameters used in each type of signal processing. The header analyzing unit 101 sets an operation of a sequencer 104 so that the setting result of the operation mode is reflected thereon. The content of the header separated by the header analyzing unit 101 is transferred to a header adding unit 108.

If the data block in the packet is to be processed by the signal processing block 100 as a result of the analysis made by the header analyzing unit 101, the data block separated from the header by the header analyzing unit 101 is transferred to a line buffer 102 with predetermined timing. The line buffer 102 outputs sequentially transferred data blocks in units of horizontal lines. Due to such input and output performed by the line buffer 102, each data block having a configuration of an operand of a packet can be dealt as being restored to a partial image data position having a two-dimensional configuration illustrated in FIGS. 2 and 3 in the subsequent stage of the line buffer 102.

In the subsequent stage of the line buffer 102, a predetermined number of image signal processing units: a first processing unit 103-1 to an n-th processing unit 103-*n*, are provided. The number of image signal processing units to be provided and the signal processing performed by each of the provided image signal processing units are appropriately changed depending on the actual configuration of the signal processing part as the signal processing block 100. In FIG. 5, the first processing unit 103-1 to the n-th processing unit 103-*n* serving as the image signal processing units are mutually connected in series. Alternatively, these image signal processing units may be mutually connected in parallel. Also, a series connection and a parallel connection can be used together.

Registers 105-1 to 105-*n* are provided for the first processing unit 103-1 to the n-th processing unit 103-*n*, respectively.

The sequencer 104 sets appropriate parameters to the respective registers 105-1 to 105-*n* in accordance with the setting made by the header analyzing unit 101. The first processing unit 103-1 to the n-th processing unit 103-*n* perform appropriate signal processing operations based on the parameters set in the corresponding registers. Herein, the signal processing operations include an operation of skipping substantial signal processing. In this way, the data on which signal processing has been performed by the first processing unit 103-1 to the n-th processing unit 103-*n* is output to the header adding unit 108.

The header adding unit 108 receives the data of the header transferred from the header analyzing unit 101 and the image data (originally data block) processed by the image signal processing units. In the header adding unit 108, predetermined information in the header is rewritten as necessary on the basis of the signal processing result of the image signal processing units. Then, the header adding unit 108 converts the image data processed by the image signal processing units to a block data configuration as an operand of the packet and adds the header thereto so as to perform packetization. The packet generated in this way is output via the internal bus 21.

As an example, an operation of the signal processing block 100 in the resolution converting unit 14 is described. In this case, the header analyzing unit 101 determines whether resolution conversion is to be performed by referring to the processing path information in the header. If a value "0" is stored in the bit position of the resolution conversion, that is, if the resolution conversion should be skipped, this packet is output from the header adding unit 108 to the internal bus 21. In some cases, the packet may be abandoned and is not output to the internal bus 21.

On the other hand, if a value "1" is stored in the bit position of the resolution conversion, the resolution conversion should be performed. In that case, the bit position of the resolution conversion in the history information is further referred to and it is determined whether the bit value is "1" (process has been performed) or "0" (process has not been performed).

If the bit value indicates that the process has been performed, the signal processing block 100 need not perform the signal processing again. Accordingly, as in the case where "0" is stored in the bit position of the resolution conversion in the processing path information, the packet is output to the internal bus 21 or abandoned. On the other hand, if the process has not been performed, the header analyzing unit 101 transfers the data block to the line buffer 102 for resolution conversion. In this case, the header analyzing unit 101 recognizes instructions about the resolution conversion stored in the command flag and sets parameters in the sequencer 104 in accordance with the recognition result. The parameters used here include the ratio of a converted image size to a reference image size. In accordance with the set parameters, the image signal processing system (first processing unit 103-1 to n-th processing unit 103-*n*) performs thinning or interpolation of pixels for resolution conversion on the data block.

The header adding unit 108 receives the data block on which resolution conversion has been performed from the image signal processing system in the above-described manner. Also, the header adding unit 108 rewrites the data of the header received from the header analyzing unit 101, for example, sets "1" indicating that the process has been performed in the bit position of the resolution conversion in the history information. Then, the header adding unit 108 adds the rewritten header to the data block on which resolution conversion has been performed so as to regenerate the packet and outputs it.

Also, an example of a usage pattern of the extended information in the header is described.

As described above, the extended information is information that is obtained through signal processing performed on the data block and includes an evaluation value of complexity of an image. The evaluation value of complexity of the image can be obtained based on a frequency characteristic of an image signal as a data block. For example, the content of an image becomes more complex as the level of a high-frequency band becomes higher as the frequency characteristic. Accordingly, the evaluation value of complexity of the image can be calculated based on the frequency characteristic of the data block.

Such a frequency characteristic of an image signal can be actually detected in a predetermined processing stage in the camera signal processing unit 12. The camera signal processing unit 12 calculates the above-described evaluation value based on the detected frequency characteristic during processing of the data block. This evaluation value is stored as extended information in the header when the signal-processed data is output as a packet from the camera signal processing unit 12.

This evaluation value can be used when the encoding unit 15 performs compression/encoding. That is, the signal processing block 100 in the encoding unit 15 performs compression/encoding by changing and setting a compression ratio (encoding efficiency) in accordance with the evaluation value (complexity of the image) recognized by header analysis. Accordingly, compression/encoding is performed based on the compression ratio that is appropriate for the content of the image.

As can be understood from the above-described configuration and operation of the signal processing block 100, the signal processing block 100 uses a data block stored in each packet, that is, partial image data having a size of the number of partial horizontal pixels N×the number of partial vertical pixels N, as a processing unit. With this method, the size of a buffer memory to temporarily hold image data can be significantly reduced compared to a configuration of typical image signal processing where image data of one screen is used as a processing unit. As such a buffer memory, the line buffer 102 illustrated in FIG. 5 is used. If image data of one screen is used as a processing unit, a line buffer having the size corresponding to the number of horizontal pixels in one screen is required. On the other hand, in this embodiment, the size corresponding to a smaller number of pixels N may be used. Although not illustrated in FIG. 5, in a case where a buffer memory to hold image data of a processing unit is required, the size corresponding to one frame is unnecessary, but the size corresponding to a data block is used in this embodiment.

Typically, each signal processing unit can accept a next process only after a process of data of a predetermined processing unit has completed. In a case where image data of one screen is regarded as a processing unit, if a process of data of one screen has not ended in a signal processing unit, the data is not transferred to the signal processing unit in the subsequent stage and the end of the process is waited for even if signal processing has ended in the previous stage. That is, processing timing is adjusted and thus processing efficiency is likely to decrease. On the other hand, in this embodiment where the data size of a processing unit is small, time occupied to process each processing unit in each signal processing unit can be significantly shortened. Accordingly, the above-described factors decreasing the processing efficiency can be significantly reduced.

According to the above description, the signal processing block 100 determines the necessity of signal processing based on the information stored in the header of each packet. When signal processing is to be performed, the signal processing block 100 determines and sets the processing based on predetermined information stored in the header and then performs the signal processing. This means that the signal processing block 100 is capable of independently performing an appropriate signal processing operation by using the information stored in the header. That is, in the image capturing apparatus 1 according to this embodiment, part of a signal processing function of the camera signal processing unit 12, the resolution converting unit 14, and the encoding unit 15 are capable of independently performing signal processing.

Typically, setting of whether signal processing is to be performed and setting of parameters in those signal processing units are performed by the CPU. Compared to this configuration, the CPU in the control unit 16 according to this embodiment need not perform a processing step to control the signal processing units, and thus a processing load is reduced accordingly.

As described above, in this embodiment, efficiency of image signal processing is enhanced in terms of hardware resources and processing efficiency.

A typical image capturing apparatus such as a video camera apparatus under present circumstances is capable of capturing and recording a still image as well a normal moving image. During capturing and recording of a still image, a still image can be captured by setting a shooting mode for a still image and by performing an operation equivalent to a press of a shutter button, as in a normal still camera. Also, an apparatus having a function capable of capturing and recording a still image by performing an operation equivalent to a press on a shutter button during capturing and recording of a moving image (hereinafter referred to as moving/still images concurrent capturing) has been known.

The image capturing apparatus 1 according to this embodiment is also capable of capturing and recording a still image in addition to a moving image and is further capable of performing the above-described moving/still images concurrent capturing. Hereinafter, an example of signal processing performed during the moving/still images concurrent capturing by the image capturing apparatus 1 is described.

Figure 6:
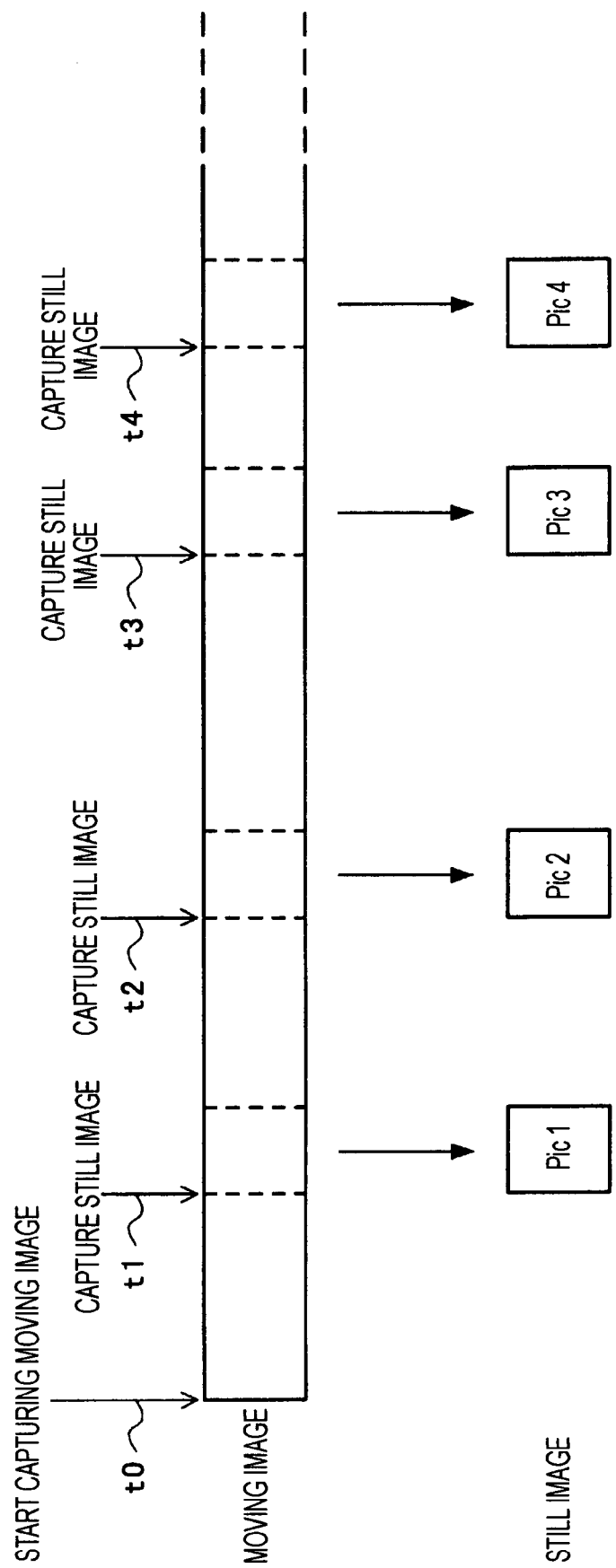
FIG. 6 illustrates an example of timings to capture moving and still images (image data obtaining timings) during moving/still images concurrent capturing.

FIG. 6 schematically illustrates an example of capturing timings of moving and still images when the image capturing apparatus 1 according to this embodiment is performing the moving/still images concurrent capturing.

Referring to FIG. 6, assume that a user performs an operation to start capturing and recording of a moving image at time t0. In accordance with this operation, the image capturing apparatus 1 continues capturing and recording of the moving image from time t0 to the end of capturing of the moving image. During the capturing and recording of the moving image, the image capturing apparatus 1 converts image signals obtained through capturing to image data by performing preprocessing of a predetermined stage in the manner described above. Then, the image capturing apparatus 1 packetizes the image data and appropriately performs predetermined image signal processing in units of packets thereafter. Then, the image capturing apparatus 1 sequentially writes the image data on which the image signal processing has been performed as moving image data to be recorded on the storage medium so that the moving image data is stored therein.

In this case, a shutter operation to capture a still image is performed at time t1, time t2, time t3, and time t4 during recording of the moving image after time t0. In accordance with the shutter operations to capture still images, images captured at the shutter operation timings are obtained as still image data segments Pic1, Pic2, Pic3, and Pic4, each corresponding to one still image, as illustrated in FIG. 6. For example, each of the still image data segments Pic1, Pic2, Pic3, and Pic4 can be obtained by copying image data of the frame corresponding to the shutter operation timing from the image data in units of frames that can be obtained by the preprocessing performed by the camera signal processing unit 12.

As described above with reference to FIG. 6, image data of a still image can be obtained in parallel with image data of a moving image in accordance with the operation of moving/still images concurrent capturing. The image capturing apparatus 1 according to this embodiment appropriately records the image data of the moving and still images obtained in the above-described manner in the storage medium. For this purpose, adequate image signal processing including preprocessing, camera signal processing, resolution conversion, and compression/encoding needs to be performed on the image data of the moving and still images. The image capturing apparatus 1 according to this embodiment performs the signal processing on the image data of the moving and still images in the following way.

The signal processing described above with reference to FIGS. 2 to 6 is performed on the image data of the moving image. That is, the image data is converted to digital image data in the camera signal processing unit 12, the digital image data is divided into data blocks so as to be packetized, and the signal processing thereafter is performed by inputting/outputting (transferring) the data to the signal processing units in units of packets.

Also, in the image data of the still images, image data of one still image (in FIG. 6, each of the still image data segments Pic1, Pic2, Pic3, and Pic4) is divided into data blocks so as to be packetized.

The processing to packetization may be performed as processing for the still images independently from processing for the moving image, but packetization on the frame image during the above-described processing on a moving image can be used. That is, in the moving/still images concurrent capturing, image data of a still image captured at a shutter operation timing during capturing and recording of a moving image is extracted. During capturing and recording of a moving image, a frame image captured at a shutter operation timing can be used as image data of a still image. In a processing sequence of a moving image, the frame image captured at the above-described shutter operation timing is also divided into blocks and is packetized. Thus, by copying packets of the image data of one frame obtained in this way for a still image, packetized still image data of one screen can be obtained.

As described above, in this embodiment, image data of both moving and still images are packetized in the moving/still images concurrent capturing. Then, signal processing is performed at the timings illustrated in FIG. 7 on the packets obtained in this way.

Figure 7:
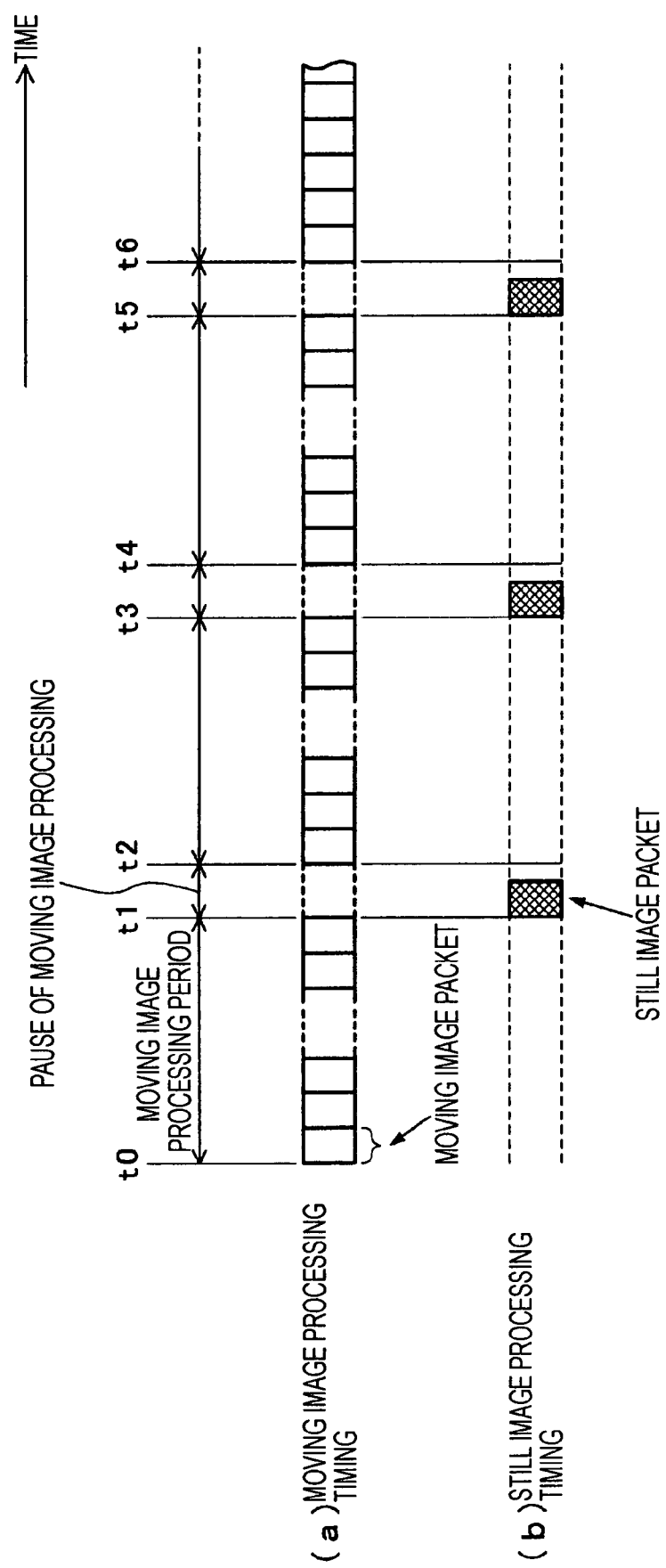
FIG. 7 illustrates timings of processing moving and still images during moving/still images concurrent capturing according to the embodiment.

In FIG. 7, (a) and (b) illustrate processing timings for respective packets of moving image data and still image data. The processing timings illustrated in this figure are the timings of signal processing performed by the signal processing block 100 in one of the image signal processing units (camera signal processing unit 12, resolution converting unit 14, and encoding unit 15).

First, the processing timings of the moving image data are described. At time t0 in (a) of FIG. 7, sequential input of packets starts. Accordingly, the signal processing block 100 sequentially and continuously processes the input packets. At time t1, input of the packets of image data stops, and thus the signal processing block 100 stops the processing on the packets accordingly. At time t2 after some time from time t1, input of packets of the moving image starts again, and thus processing on the packets starts accordingly. That is, a moving image processing period where a predetermined number of packets are sequentially processed and a pause of moving image processing where processing of packets is paused alternately appear. The pause of moving image processing corresponds to, for example, a vertical blanking period of image signals.

On the other hand, signal processing performed on still image data according to this embodiment is illustrated in (b) of FIG. 7. That is, the still image data is sequentially processed in units of packets by using the pause of moving image processing, where no signal processing is performed on the moving image data.

For example, conventional processing of still image data during the moving/still images concurrent capturing is as follows.

In accordance with a shutter operation during capturing and recording of a moving image, image data of an image captured by this operation is extracted and is held in an internal buffer memory. After the capturing and recording of the moving image have ended and after the corresponding moving image data has been stored in a storage medium, signal processing including camera signal processing, resolution conversion, and compression/encoding is performed on the still image data that has been held in the internal buffer memory and the still image data is stored in the storage medium.

In the processing of the still image data, the period when the image capturing apparatus performs an operation for recording data after capturing a moving image is relatively long. Such an operation is uncomfortable for a user. Also, the image capturing apparatus does not respond to an operation (e.g., reproducing of a recorded file) immediately after capturing and recording of a moving image, which causes stress.

On the other hand, in this embodiment, processing of still image data can be intermittently performed in accordance with progress of processing of moving image data at the signal processing timings illustrated in FIG. 7. Accordingly, processing of still image data can be completed during capturing and recording of a moving image. Also, even if processing of still image data does not complete, the processing can be completed to some extent during capturing and recording of a moving image, and thus the processing time after capturing and recording of the moving image can be shortened. That is, the above-described inconvenience is solved or alleviated.

According to the illustration in FIG. 7, a packet of still image data is processed during a pause of moving image processing. This is for clearly illustrating that the pause of moving image processing is the processing timing for a packet of still image data. In practice, two or more packets of still image data may be processed in accordance with the relationship between the time length actually obtained as the pause of moving image processing and the time length required to process a packet that depends on actual signal processing. Furthermore, when as many packets as possible are processed during the pause of moving image processing, the speed of processing the still image data can be increased, so that processing efficiency enhances.

In this embodiment, while signal processing of image data progresses, the size of data block stored in a packet may become different from the size at the packetization. For example, this is when resolution conversion is performed by the resolution converting unit 14. In this case, the number of pixels (the number of pieces of pixel data) forming a data block at packetization is converted, and thus the size of the data block after the processing is changed in accordance with the number of pixels after conversion.

For example, when the number of pixels is increased in the resolution conversion, the size of the data block stored in the packet also increases. In this case, for example, the signal processing unit to receive and process the packet after resolution conversion may be incapable of accepting the data block if the increased size of the data block exceeds the size that can be processed. This causes an inconvenience that a signal processing error occurs.

Figure 8:
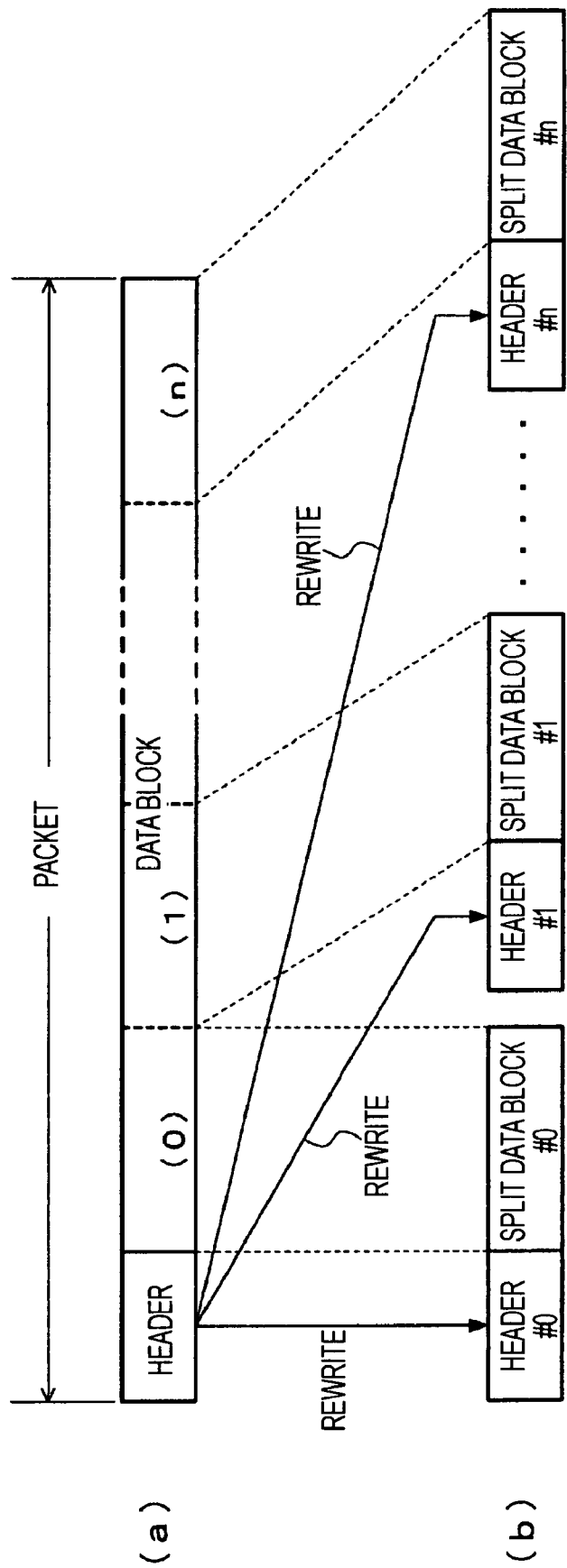
FIG. 8 schematically illustrates a procedure of reconstructing packets according to the embodiment.

In this embodiment, in order to avoid such inconvenience, a packet is reconstructed in the signal processing block 100 in the resolution converting unit 14, as illustrated in FIG. 8.

In FIG. 8, (a) illustrates a packet storing a data block of which size is larger than that before resolution conversion, for example. In order to reconstruct this packet, the original data block is divided into n−1 parts, each having a predetermined size, so as to obtain split data blocks #0 to #n, as shown in the transition from (a) to (b) of FIG. 8. Then, headers #0 to #n are added to the split data blocks #0 to #n, respectively, so that n−1 packets are generated. At this time, the headers #0 to #n are regenerated by rewriting necessary information items based on the content of the original header illustrated in (a) of FIG. 8. For example, since the data block is divided, area coordinates and area size change with respect to the original block data (the area coordinates of the split data block # are the same as those of the original data block). Thus, those pieces of information are rewritten in accordance with the corresponding split data blocks.

Such a process of reconstructing packets may be performed by the header adding unit 108 illustrated in FIG. 5, for example. In the procedure illustrated in FIG. 8, the packet illustrated in (a) is generated and then the packet is divided as illustrated in (b) for reconstruction. However, this illustration is for clear understanding, and the packet illustrated in (a)

need not be temporarily formed in an actual process of reconstructing packets by the header adding unit 108. That is, split data blocks and corresponding headers are generated by using the original packet transferred from the header analyzing unit 101 and the processed data block output from the first to n-th processing units, and then packets are regenerated accordingly.

Hereinafter, modifications of the configuration according to the above-described embodiment are described with reference to FIGS. 9 to 11.

Figure 9:
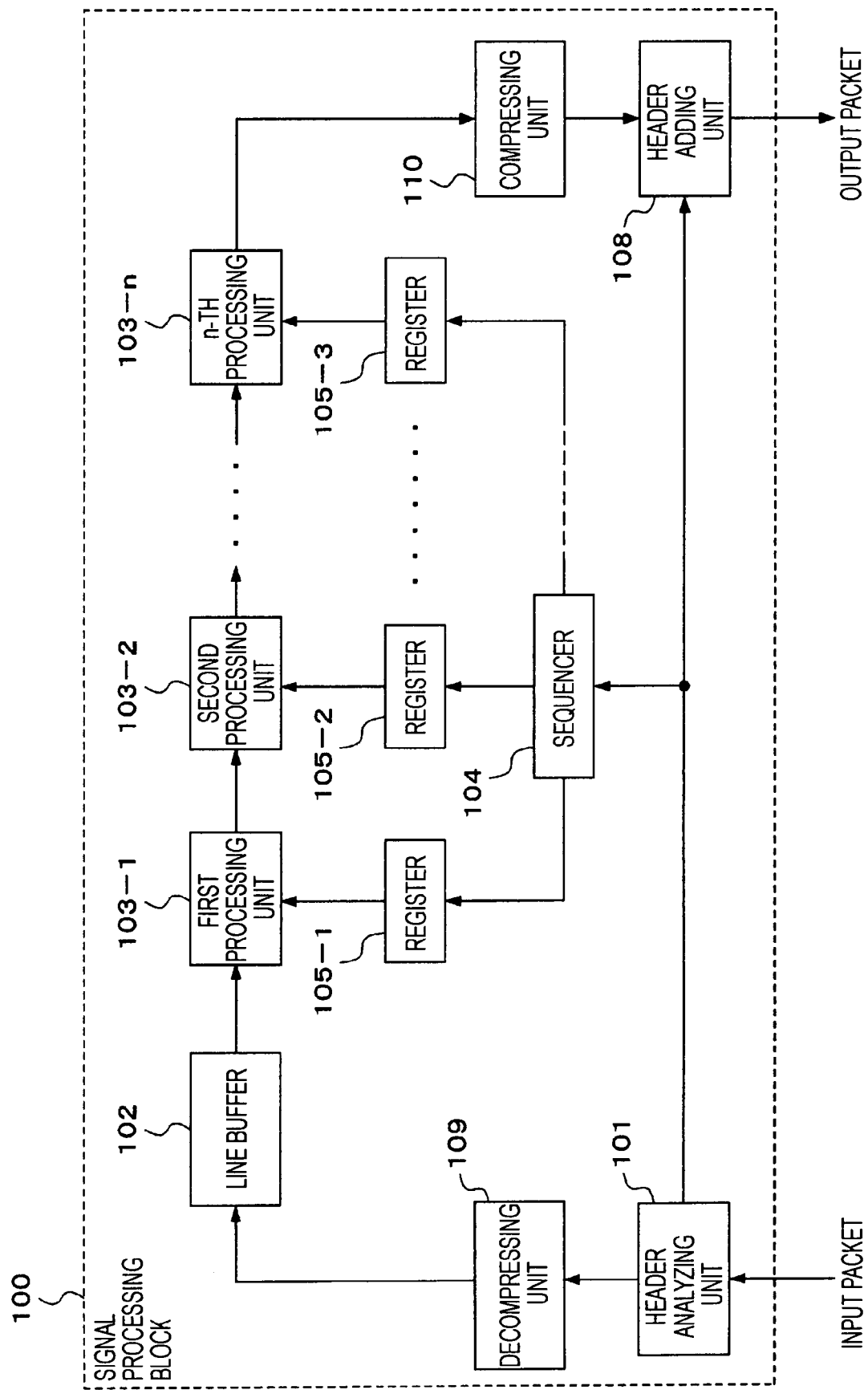
FIG. 9 illustrates a signal processing block according to a modification.

FIG. 9 illustrates a modification of the signal processing block 100. In FIG. 9, parts that are the same as those in FIG. 5 are denoted by the same reference numerals and the corresponding description is omitted.

In the signal processing block 100 illustrated in FIG. 9, a decompressing unit 109 and a compressing unit 110 are provided. This configuration is made so that, when a packet is transmitted through the transmission path (internal bus 21), the data block stored therein is compressed. Although not illustrated in the drawings, this configuration is realized based on the assumption that the packet processing unit 13 performs packetization by compressing a data block in a process of generating the data block.

For example, upon input of a packet to be processed to the signal processing block 100 illustrates in FIG. 9, the header analyzing unit 101 separates the data block from the header and outputs the data block to the decompressing unit 109. The decompressing unit 109 receives the data block and performs decompression (decoding) corresponding to the compression method of the data block. Then, the data block that has been restored to the original format before compression by decompression is output to the line buffer 102, so that signal processing is performed thereon. The compressing unit 110 receives the data block that has been processed by the first to n-th processing units 103-1 to 103-n and performs compression thereon in accordance with a predetermined method. Then, the compressing unit 110 outputs the compressed data block to the header adding unit 108. The header adding unit 108 adds the header to the compressed data block and outputs it to the internal bus 21 (transmission path).

With this configuration of the signal processing block 100, each packet transmitted between the signal processing blocks can maintain a state where the data block therein is compressed. By transmitting the data block while being compressed, the amount of traffic in the transmission path, such as the internal bus 21, is suppressed and transmission efficiency enhances.

FIG. 10 illustrates another modification of the signal processing block 100. In FIG. 10, parts that are the same as those in FIG. 5 are denoted by the same reference numerals and the corresponding description is omitted.

The signal processing block 100 illustrated in FIG. 10 is configured so that the data block is encrypted while the packet is transmitted through the transmission path. For this purpose, a decrypting unit 111 and an encrypting unit 112 are provided.

For example, upon input of a packet to be processed to the signal processing block 100 illustrated in FIG. 10, the data block separated from the header in the header analyzing unit 101 is input to the decrypting unit 111. The decrypting unit 111 decrypts the input data block. Then, the decrypted data block is input to the signal processing system (line buffer 102 and first to n-th processing units 103-1 to 103-n), where predetermined processing is performed. Then, the encrypting unit 112 encrypts the data block output from the signal processing system and outputs the data block to the header adding unit 108. The header adding unit 108 adds the header to the encrypted data block and outputs it to the internal bus 21 (transmission path).

With this configuration of the signal processing block 100, each packet transmitted between the signal processing blocks can maintain a state where the data block therein is encrypted. For example, even when the signal processing units connected via a transmission path are configured as black boxes, if a packet is being transmitted through the transmission path, the content of the packet can be observed. In such a case, that is, in a case where security and confidentiality are required in signal processing of a captured image, the configuration illustrated in FIG. 10 enables increased security of the content of image data to be processed.

The configuration adopting compression/decompression or encryption/decryption illustrated in FIGS. 9 and 10 can be used for image data of one screen or data of a larger unit, as well as units of packets (data blocks). However, by performing packetization so as to process data in units of data blocks as in this embodiment, the circuit scale for compression/decompression or encryption/decryption is significantly decreased, which is advantageous in terms of cost and a circuit mounting size.

Hereinafter, another modification is described with reference to FIG. 11. The configuration illustrated in FIG. 11 is a modification of the configuration illustrated in FIG. 1. In FIG. 11, parts that are the same as those in FIG. 1 are denoted by the same reference numerals and the corresponding description is omitted.

In this configuration, an internal memory 22 is provided. The internal memory 22 includes an SDRAM (synchronous dynamic random access memory) or an SRAM (static RAM) of a predetermined size, and connects to the camera signal processing unit 12, the resolution converting unit 14, and the encoding unit 15 via a data bus as illustrated in FIG. 11. That is, the internal memory 22 connects to the signal processing units performing signal processing on packets.

In this modification, packets are transmitted among the camera signal processing unit 12, the resolution converting unit 14, and the encoding unit 15 through writing/reading on/from the internal memory 22, not via the internal bus 21. In accordance with this configuration in which packets are transmitted not via the internal bus, the packet processing unit 13 is provided in the camera signal processing unit 12. That is, the internal memory 22 and writing/reading thereon/therefrom constitute the transmission path of packets.

With this configuration, the communication path used by the control unit 16 (CPU) to control the other part and the path to transmit packets are independent from each other. Accordingly, the amount of traffic can be reduced in each of communication in a control system on the control unit 16 side and communication for transmitting packets, so that efficiency can be enhanced.

The present invention is not limited to the configurations according to the above-described embodiment and modifications, but can be appropriately modified. For example, a video camera is used as the image capturing apparatus in the above-described embodiment, but another type of image capturing apparatus, such as a digital still camera, can be used. In the above-described embodiment, the image signal processing performed on packets includes part of camera signal processing, resolution conversion, and encoding, in accordance with the configuration of the image capturing apparatus as a video camera. However, other types of processing can also be performed. Also, the present invention can be applied to an apparatus having an image signal processing function other than the image capturing apparatus. Furthermore, the concept of the present invention can be applied to signal processing performed on data other than image data, such as audio data.

It should be understood by those skilled in the art that various modifications, combinations, sub-combinations and alterations may occur depending on design requirements and other factors insofar as they are within the scope of the appended claims or the equivalents thereof.

The invention claimed is:

1. An image signal processing apparatus, comprising:
a processor encoded with instructions that at least define:
partial image data block obtaining means for obtaining partial image data blocks by dividing image data corresponding to a predetermined screen having a predetermined number of horizontal and vertical pixels into image data portions at predetermined positions, each partial image data block having a predetermined number of partial horizontal pixels and a further predetermined number of partial vertical pixels,
packet generating means for generating packets, each storing one of the partial image data blocks, and
one or more signal processing means for receiving the packets from a transmission path through which the image data is transmitted, performing signal processing in units of partial image data blocks stored in the packets, and outputting the image data in the form of packets to the transmission path.

2. The image signal processing apparatus according to claim 1, wherein the packet generating means generates the packets each including one of the partial image data blocks added with a header, and wherein the header has an area to store position information capable of specifying the position of the partial image data block of the packet in the image data of the original screen.

3. The image signal processing apparatus according to claim 2, wherein the processor is further encoded with instructions that define:
image data restoring means for generating signal-processed image data corresponding to the original image data by specifying the positions of the partial image data blocks extracted from the packets with reference to the position information and by combining the partial image data blocks.

4. The image signal processing apparatus according to claim 1, wherein the packet generating means generates the packets each including one of the partial image data blocks added with a header, and wherein the header stores size information capable of indicating the size of the partial image data block of the packet.

5. The image signal processing apparatus according to claim 1, wherein the packet generating means generates the packets each including one of the partial image data blocks added with a header, and wherein the header has an area to store parameter specifying information capable of specifying a parameter to be set for predetermined processing performed by the signal processing means on the partial image data block of the packet.

6. The image signal processing apparatus according to claim 5, wherein the signal processing means determines the signal processing to be performed with reference to the parameter specifying information stored in the header of the packet before performing signal processing on the partial image data block stored in the packet.

7. The image signal processing apparatus according to claim 1, wherein the packet generating means generates the packets each including one of the partial image data blocks added with a header, and wherein the header has an area to store signal processing specifying information indicating a plurality of types of the signal processing performed by the signal processing means on the partial image data block of the packet, together with the order of the signal processing.

8. The image signal processing apparatus according to claim 7, wherein the signal processing means determines whether each type of the signal processing is to be performed on the partial image data block stored in the packet with reference to the signal processing specifying information stored in the header of the packet.

9. The image signal processing apparatus according to claim 1, wherein the packet generating means generates the packets each including one of the partial image data blocks added with a header, and wherein the header has an area to store progress indicating information indicating progress of each type of the signal processing performed by the signal processing means on the partial image data block of the packet.

10. The image signal processing apparatus according to claim 9, wherein the signal processing means determines whether each type of the signal processing is to be performed on the partial image data block stored in the packet based on whether the progress indicating information stored in the input packet indicates that the signal processing has been performed.

11. The image signal processing apparatus according to claim 10, wherein the signal processing means rewrites the progress indicating information stored in the packet in accordance with that the signal processing has been performed on the partial image data block stored in the packet.

12. The image signal processing apparatus according to claim 1, wherein the packet generating means generates the packets each including one of the partial image data blocks added with a header, and wherein the header has an area to store processing result information including predetermined content that is obtained as a result of the signal processing performed by predetermined one the signal processing means on the partial image data block of the packet.

13. The image signal processing apparatus according to claim 12, wherein the signal processing means rewrites the processing result information stored in the packet in accordance with that the signal processing has been performed on the partial image data block stored in the packet.

14. The image signal processing apparatus according to claim 12, wherein the signal processing means changes and sets a predetermined parameter used in predetermined signal processing performed by the signal processing means based on the processing result information stored in the input packet.

15. The image signal processing apparatus according to claim 1, wherein the packet generating means is capable of generating packets for a moving image based on image data of one screen of the moving image and generating packets for a still image based on image data of one screen of the still image, and wherein the signal processing means performs the signal processing on the partial image data block stored in one of the packets for the still image during a pause of the signal processing performed on the partial image data blocks stored in the packets for the moving image.

16. The image signal processing apparatus according to claim 1, wherein the packet generating means obtains a predetermined number of split partial image data blocks by dividing the partial image data block on which predetermined signal processing has been performed by predetermined one of the signal processing means and adds headers generated based on the header stored in the packet including the original partial image data block to those split partial image data blocks so as to generate split packets.

17. The image signal processing apparatus according to claim 1, wherein the processor is further encoded with instructions that define:

partial image data block compressing/decompressing means for performing compression when the partial image data block stored in the packet is to be transmitted through the transmission path and performing decompression corresponding to the compression when the signal processing by the signal processing means is to be performed on the partial image data block stored in the packet.

18. The image signal processing apparatus according to claim 1, wherein the processor is further encoded with instructions that define:

partial image data block encrypting/decrypting means for performing encrypting when the partial image data block stored in the packet is to be transmitted through the transmission path and performing decrypting corresponding to the encrypting when the signal processing by the signal processing means is to be performed on the partial image data block stored in the packet.

19. An image signal processing method, comprising:

obtaining partial image data blocks by dividing image data corresponding to a predetermined screen having a predetermined number of horizontal and vertical pixels into image data portions at predetermined positions, each partial image data block having a predetermined number of partial horizontal pixels and a further predetermined number of partial vertical pixels;

generating packets, each storing one of the partial image data blocks; and receiving the packets from a transmission path through which the image data is transmitted, performing signal processing in units of partial image data blocks stored in the packets, and outputting the image data in the form of packets to the transmission path.

20. An image signal processing apparatus, comprising:

a processor encoded with instructions that at least define:

a partial image data block obtaining unit configured to obtain partial image data blocks by dividing image data corresponding to a predetermined screen having a predetermined number of horizontal and vertical pixels into image data portions at predetermined positions, each partial image data block having a predetermined number of partial horizontal pixels and a further predetermined number of partial vertical pixels, a packet generating unit configured to generate packets, each storing one of the partial image data blocks, and one or more signal processing units configured to receive the packets from a transmission path through which the image data is transmitted, perform signal processing in units of partial image data blocks stored in the packets, and output the image data in the form of packets to the transmission path.

* * * * *